US011989369B1

(12) United States Patent
Ben-Amram et al.

(10) Patent No.: US 11,989,369 B1
(45) Date of Patent: May 21, 2024

(54) NEURAL NETWORK-BASED TOUCH INPUT CLASSIFICATION

(71) Applicant: Microsoft Technology Licensing, LLC, Redmond, WA (US)

(72) Inventors: Nadav Shlomo Ben-Amram, Herzliya (IL); Adam Hakim, Tel Aviv (IL); Roy-Gan Maiberger, Kiryat Ono (IL); Anatoly Tsvetov, Kfar Yona (IL); Yoel Yehezkel Einhoren, Petah Tiqwa (IL); Etai Zajonts, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/193,188

(22) Filed: Mar. 30, 2023

(51) Int. Cl.
G06F 3/041 (2006.01)
G06F 3/0354 (2013.01)
G06F 3/044 (2006.01)
G06N 3/04 (2023.01)

(52) U.S. Cl.
CPC ...... *G06F 3/04166* (2019.05); *G06F 3/03545* (2013.01); *G06F 3/0416* (2013.01); *G06F 3/0418* (2013.01); *G06F 3/044* (2013.01); *G06N 3/04* (2013.01); *G06F 2203/04108* (2013.01)

(58) Field of Classification Search
None
See application file for complete search history.

(56) References Cited

U.S. PATENT DOCUMENTS

| 2009/0095540 | A1 | 4/2009 | Zachut et al. |
| 2016/0077616 | A1 | 3/2016 | Durojaiye et al. |
| 2016/0077663 | A1 | 3/2016 | Durojaiye et al. |
| 2017/0300170 | A1 | 10/2017 | Hinckley et al. |
| 2018/0121052 | A1 | 5/2018 | Durojaiye et al. |
| 2018/0144242 | A1* | 5/2018 | Simard ............... G06N 3/045 |
| 2019/0258353 | A1 | 8/2019 | Drumm et al. |
| 2020/0012382 | A1 | 1/2020 | Lee |
| 2020/0064960 | A1 | 2/2020 | Munemoto |
| 2021/0090261 | A1* | 3/2021 | Sugimoto ............. G16H 50/50 |
| 2021/0181919 | A1 | 6/2021 | Agarwal et al. |
| 2022/0050577 | A1 | 2/2022 | Birenberg et al. |

FOREIGN PATENT DOCUMENTS

CN        110531894 A     12/2019

* cited by examiner

*Primary Examiner* — Stephen T. Reed
(74) *Attorney, Agent, or Firm* — Alleman Hall & Tuttle LLP

(57) ABSTRACT

Examples are disclosed that relate to improving speed and accuracy of touch input classification. In one example, a touch detection device includes an array of antennas configured to measure touch input and output a touch matrix of pixels having touch values corresponding to the touch input measured at each antenna of the array of antennas. The touch detection device further includes a neural network having an input layer including a plurality of nodes. Each node is configured to receive a touch value corresponding to a different pixel of the touch matrix. The neural network is configured to output classified touch data corresponding to the measured touch input based at least on the touch matrix.

20 Claims, 9 Drawing Sheets

NEURAL NETWORK-BASED TOUCH INPUT CLASSIFICATION

BACKGROUND

A touch detection device, such as a computing device including a touch screen, allows a user to provide touch input to the touch screen to control operation of the touch detection device. The touch detection device enables a user to interact directly with the touch detection device by providing touch input rather than using a mouse, keyboard, or other non-touch input devices. The touch detection device may be configured to detect different forms of touch input, such as simple finger touch input, multi-touch gestures, and active stylus touch input.

SUMMARY

Examples are disclosed that relate to improving speed and accuracy of touch input classification. In one example, a touch detection device includes an array of antennas configured to measure touch input and output a touch matrix of pixels having touch values corresponding to the touch input measured at each antenna of the array of antennas. The touch detection device further includes a neural network having an input layer including a plurality of nodes. Each node is configured to receive a touch value corresponding to a different pixel of the touch matrix. The neural network is configured to output classified touch data corresponding to the measured touch input based at least on the touch matrix.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
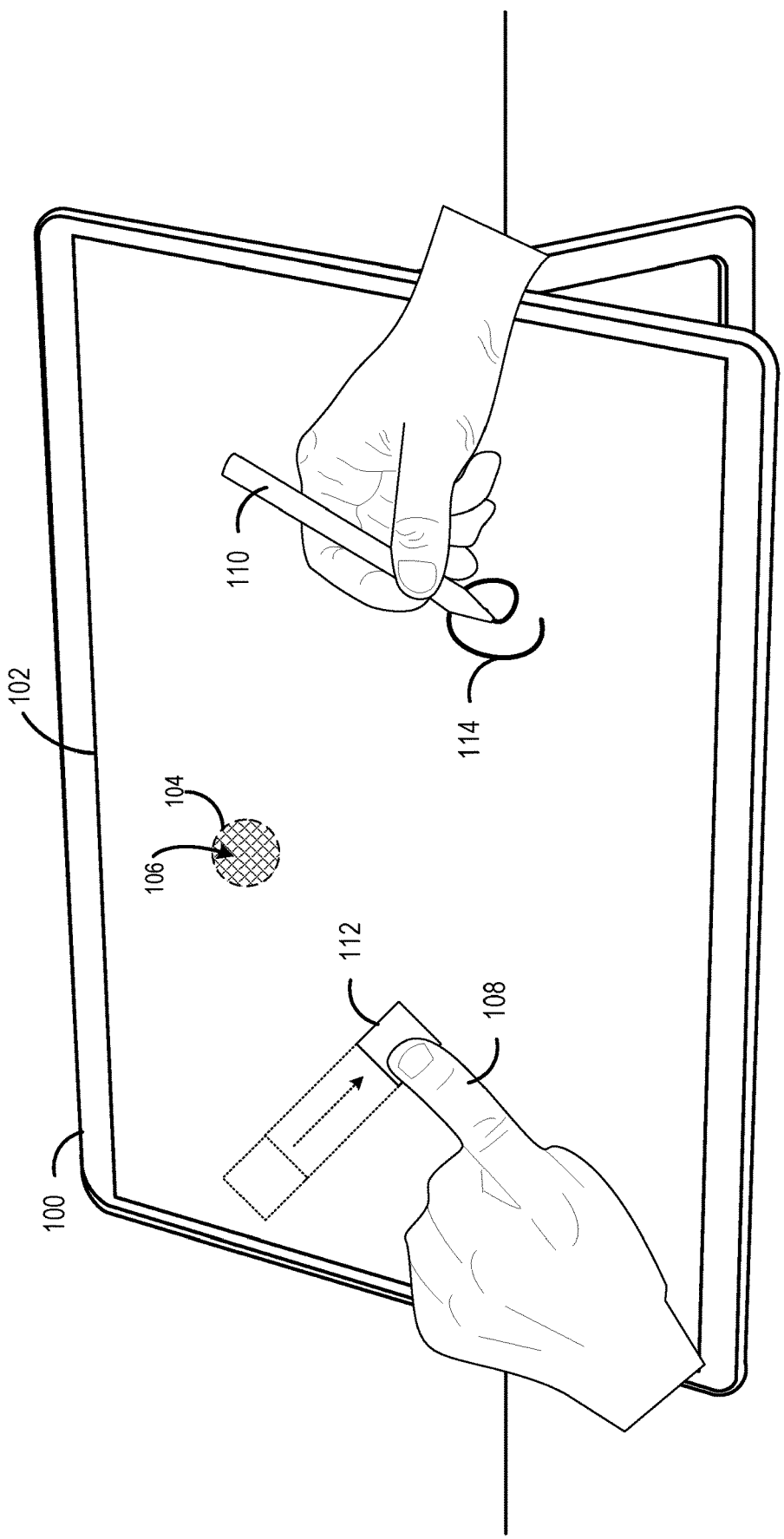
FIG. 1 shows an example touch detection device of the present disclosure.

A traditional touch detection device may be configured to detect different forms of touch input, such as simple finger touch input, multi-touch gestures, and active stylus touch input. Due to all of the different forms of touch input, it can be difficult for a traditional touch detection device to detect some forms of touch input quickly and accurately under some conditions. Traditional touch detection devices typically include an array of antennas configured to measure touch input and output a touch matrix of pixels having touch values corresponding to the touch input measured at each antenna of the array of antennas. A traditional touch detection device processes a touch matrix by running a pre-process phase that iterates through the touch matrix to detect a plurality of individual "blobs" of pixels corresponding to different instances of touch input. Then, the traditional touch detection device individually and separately classifies each touch blob as a particular type of touch input. For example, for each touch blob, features are extracted and sent to a traditional touch classifier, such as a linear regression classifier, to identify the type of touch input.

One issue with this traditional touch classification approach is that other touch input information contained in the touch matrix beyond an individual blob being classified is not considered in the touch classification process. Such additional touch input information may provide additional context that can improve touch classification accuracy. Ignoring such contextual touch input information causes scenarios where touch input can be misclassified as a different type of touch input. For example, a palm can be placed on a touch detection device in a manner in which a left portion and a right portion contact the touch detection device while a middle portion of the palm does not contact the touch detection device. In this example, a traditional touch detection device would iterate through the touch matrix and identify the left and right portions of the palm as separate touch blobs that are incorrectly classified as smaller independent touch objects instead of being classified together as one big touch object. For example, the smaller touch blobs may be incorrectly classified as plural fingers instead of a palm. Further, the incorrect classification of the touch input could produce inaccurate control of the traditional touch detection device, such as erroneous "taps" that were not intended by the user.

Another issue with this traditional classification approach is that there are scenarios where the traditional touch classifier cannot classify a particular touch blob as one type of touch input with confidence above a threshold level. In these scenarios, multiple samples of the touch blob taken from multiple touch matrices may be required to be classified before the touch blob can be classified with a confidence that exceeds the threshold level. Classifying the touch blob based at least on multiple samples creates considerable latency between the time a user provides touch input to the touch detection device and the time the touch detection device actually classifies the touch input and starts to track and report the touch input. Such latency can reduce accuracy of control of the touch detection device via user input.

Accordingly, the present disclosure is directed to an approach for improving speed and accuracy of touch input classification. In one example, a touch detection device includes an array of antennas configured to measure touch input and output a touch matrix of pixels having touch values corresponding to the touch input measured at each antenna of the array of antennas. The touch detection device further includes a neural network having an input layer including a plurality of nodes. Each node is configured to receive a touch value corresponding to a different pixel of the touch matrix. The neural network is configured to output classified touch data corresponding to the measured touch input based at least on the touch matrix.

By analyzing the entire touch matrix and not just individual touch blobs using the neural network, the neural network can apply deep learning techniques to detect and classify touch input using contextual touch information found throughout the entire touch matrix. In particular, the neural network includes multiple layers that are trained to progressively extract higher-level features from the touch matrix to accurately classify touch data corresponding to the measured touch input. The touch classification approach of the present disclosure provides the technical benefit of improving touch classification accuracy relative to traditional touch classification approaches that classify individual touch blobs. Moreover, since the neural network analyzes the entire touch matrix at once, the neural network can output classified touch data faster than traditional touch classification approaches that iteratively classify individual touch blobs within a touch matrix. In other words, the touch classification approach of the present disclosure provides the technical benefit of improving the speed at which touch classification is performed relative to traditional touch classification approaches.

FIG. 1 shows an example touch detection device 100 including a display 102 and a touch sensor 104. The display 102 is operable to emit light, such that perceptible images can be formed on the display. The touch sensor 104 includes an array of antennas 106 configured to measure touch input and output a touch matrix 208 (shown in FIG. 2) of pixels having touch values corresponding to the touch input measured at each antenna of the array of antennas 106. "Touch input" as used herein refers to detected touch that contacts the touch detection device 100 and detected near touch proximate to the touch detection device 100 without contacting the touch device, also referred to as hover input.

The touch sensor 104 is configured to detect touch input from multiple input sources simultaneously, and thus the touch detection device 100 may be referred to as a "multitouch" detection device. In the illustrated example, the touch sensor 104 is configured to detect touch input from a finger 108 and simultaneously detect touch input from an active stylus 110. The touch input from the finger 108 may be reflected in the touch matrix 208. The active stylus 110 includes an electrode configured to transmit a waveform that is received by the touch sensor 104 to determine a position of the touch input of the active stylus.

The touch detection device 100 includes a neural network 224 (shown in FIG. 2) that is configured to classify touch input data. The neural network 224 has an input layer including a plurality of nodes. Each node of the input layer is configured to receive a touch value corresponding to a different pixel of the touch matrix 208. The neural network 224 receives the entire touch matrix 208 as input. The input layer of the neural network 224 includes one or more nodes configured to receive the position of the active stylus 110. The neural network 224 is configured to output classified touch data 226 (shown in FIG. 2) corresponding to the measured touch input based at least on the touch matrix 208 and the detected position of the active stylus 110. In one example, the classified touch data includes, for each pixel of the touch matrix, one or more touch classifications (e.g., finger, thumb, palm, wrist, active stylus, no touch) and one or more confidences corresponding to the one or more touch classifications. A confidence indicates a level of correlation between the pixel and the particular touch classification. For example, a higher confidence indicates a higher correlation with a particular touch classification and vice versa.

Further, the touch detection device 100 is configured to control the display 102 based at least on the classified touch data output by the neural network 224. In the illustrated example, the neural network 224 classifies the touch input provided by the finger 108 as finger-touch input and the touch input provided by the active stylus as stylus-touch input. The touch detection device 100 determines that the finger 108 is touching a virtual block 112 displayed via the display 102 based at least on the classified touch data. The touch detection device 100 controls the display 102 to generate an appropriate graphical output in the form of moving the virtual block 112 in relation to the finger-touch input provided by the finger 108. Further, the touch detection device 100 generates a different graphical output for the active stylus in the form of a virtual ink trace 114 that tracks the stylus-touch input of the active stylus 110.

The touch detection device 100 is provided as a non-limiting example of a touch detection device that uses a neural network to classify touch data based at least on a touch matrix. The touch detection device 100 may be implemented in a variety of forms. In other examples, the touch detection device 100 may be implemented as a mobile device (e.g., tablet, smartphone) a desktop display monitor, a high-definition television screen, a laptop computer, an Internet of Things (IoT) device, etc.

Figure 2:
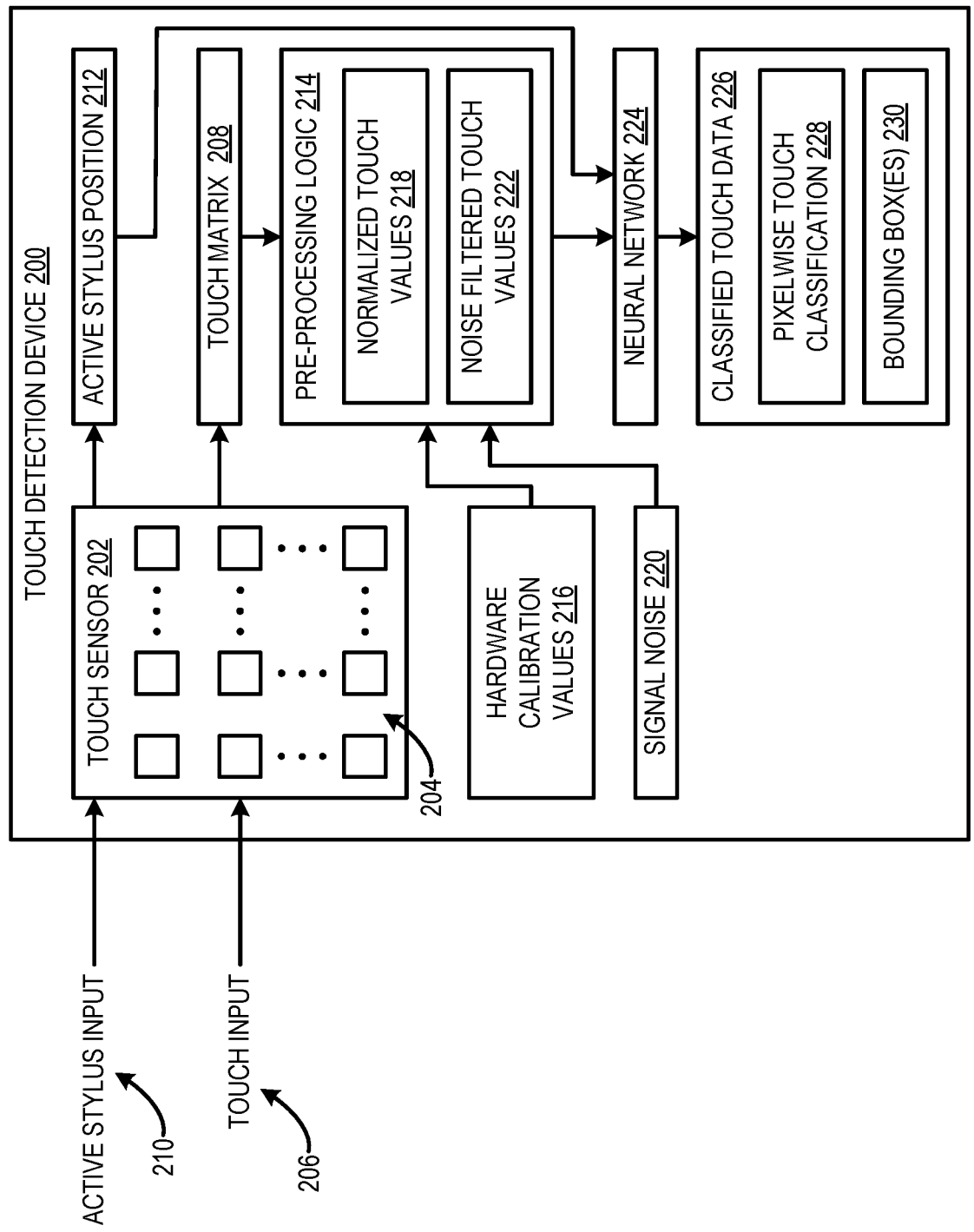
FIG. 2 shows a schematic block diagram of an example touch detection device of the present disclosure.

FIG. 2 shows a schematic view of an example touch detection device 200. For example, the touch detection device 200 may be representative of the touch detection device 100 shown in FIG. 1. The touch detection device includes a touch sensor 202 having an array of antennas 204 configured to measure touch input 206 and output a touch matrix 208 of pixels having touch values corresponding to the touch input 206 measured at each antenna of the array of antennas 204. The touch sensor 202 is configured to sense one or more sources of touch input, which may assume various suitable form(s). As examples, the touch sensor 202 may detect (1) touch input applied by a finger in contact with a surface of the touch detection device 200; (2) a force and/or pressure applied by a finger to the surface; (3) hover input applied by a finger proximate to but not in contact with the surface; (4) a height of a hovering finger from the surface, such that a substantially continuous range of heights from the surface can be determined; and/or (5) input from a non-finger touch source, such as from an active stylus (or a passive stylus).

In some implementations, the touch sensor 202 is a capacitive touch sensor and the array of antennas 204 is implemented by a plurality of electrodes (e.g., each antenna is located at an intersection of a row and column electrode). The array of electrodes may have various structural forms. For example, the plurality of electrodes may assume a variety of suitable forms, including but not limited to (1) elongate traces, as in row/column electrode configurations, where the rows and columns are arranged at substantially perpendicular or oblique angles to one another; (2) substantially contiguous pads/pixels, as in mutual capacitance configurations in which the pads/pixels are arranged in a substantially common plane and partitioned into drive and receive electrode subsets, or as in in-cell or on-cell configurations; (3) meshes; and (4) an array of isolated (e.g., planar and/or rectangular) electrodes each arranged at respective x/y locations, as in in-cell or on-cell configurations.

The capacitive touch sensor may be configured for operation in different modes of capacitive sensing. In a self-capacitance mode, the capacitance and/or other electrical properties (e.g., voltage, charge) between touch sensing electrodes and ground may be measured to detect inputs. In other words, properties of the electrode itself are measured, rather than in relation to another electrode. In a mutual capacitance mode, the capacitance and/or other electrical properties between electrodes of differing electrical state may be measured to detect inputs. When configured for mutual capacitance sensing, and similar to the above examples, the capacitive touch sensor may include a plurality of vertically separated row and column electrodes that form capacitive, plate-like nodes at row/column intersections when the touch sensor is driven. The capacitance and/or other electrical properties of the nodes can be measured to detect touch inputs. These measured electrical properties are represented as touch values of pixels in the touch matrix 208.

In other implementations, the touch sensor 202 may employ other sensing technologies to measure the touch input 206 that is represented in the touch matrix 208 output by the touch sensor 202.

Figure 3:
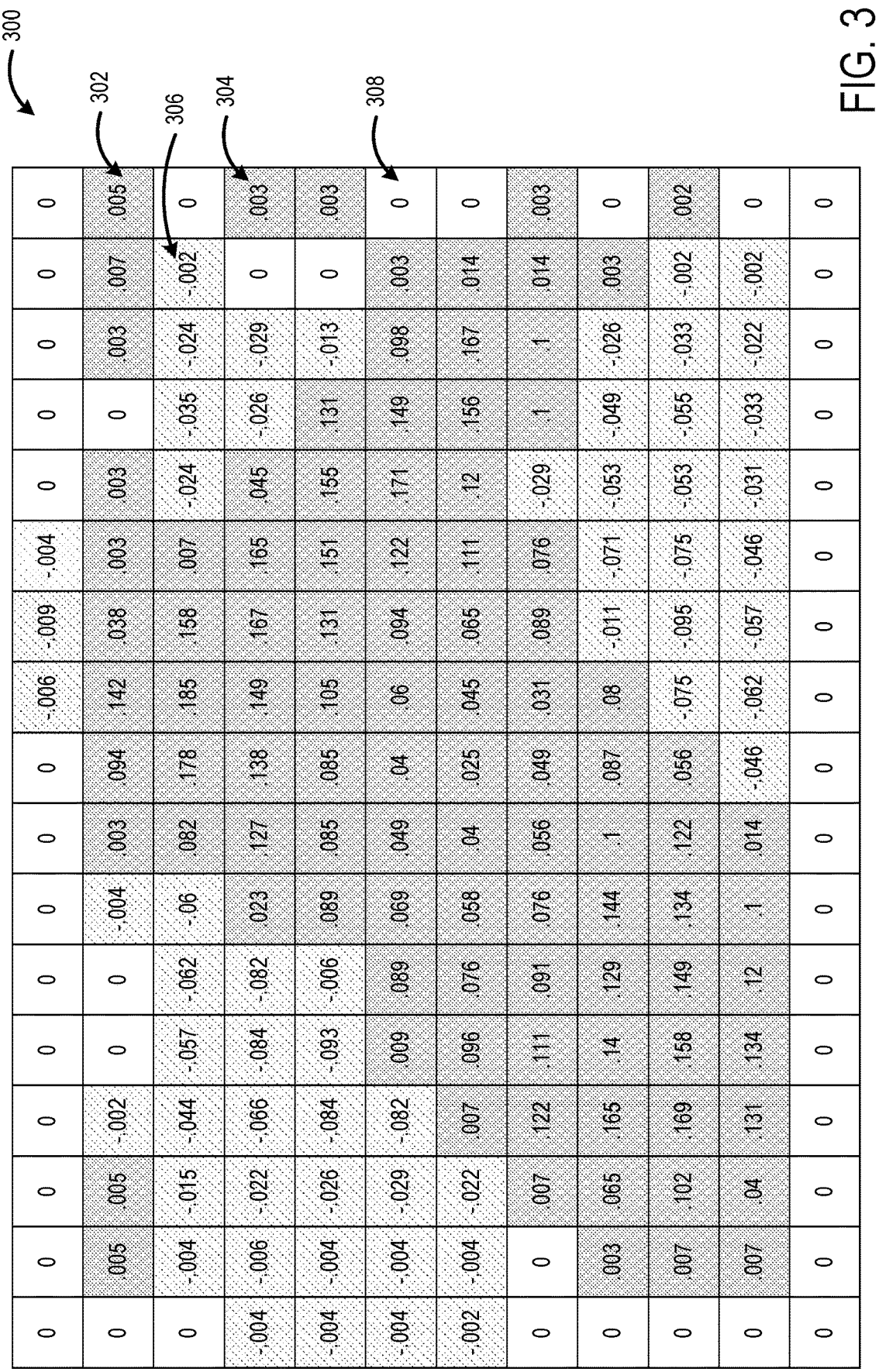
FIG. 3 shows a partial view of an example touch matrix generated based at least on touch input from a palm of a hand.

FIG. 3 shows a partial view of an example touch matrix 300 generated based at least on touch input from a palm of a hand. For example, the touch matrix 300 may be output by the touch sensor 202 shown in FIG. 2. The touch matrix 300 includes a plurality of pixels 302 having touch values corresponding to the touch input measured at each antenna of the array of antennas 204 of the touch sensor 202. The touch values of the touch matrix 300 include touch values corresponding to touch input contacting the touch detection device and touch values corresponding to touch input hovering proximate to the touch detection device. In the illustrated example, the touch values corresponding to touch input contacting the touch detection device and hovering touch input proximate to the touch detection device are represented by positive values, such as at pixel 304 that has a touch value of 0.003. In a positive touch blob, hovering touch input is represented by a smaller magnitude touch value than that of a contacting touch input.

The touch values corresponding to touch input caused by an ungrounded effect where the touch detection device is electrically ungrounded or floating, such as placed on a table without a power supply connected to the touch detection device, are represented by negative values, such as at pixel 306 that has a touch value of −0.002. Additionally, in some instances, negative values can be produced when a touch input touches the touch sensor 202 at two or more points. In one example, positive touch values are generated when a touch input touches two touch points—[X1, Y1] and [X2, Y2]. However, due to the electrical characteristics of the touch sensor 202 negative touch values are generated at [X1, Y2] and [X2, Y1] as well.

Pixels having touch values of zero, such as at pixel 308, indicate no touch input. The magnitudes of the touch values indicate the amount of contact force applied by the touch input and/or the hover distance of the touch input. The touch values may be represented in any suitable manner and may have any suitable bit depth in the touch matrix 300.

Note that the touch matrix 300 is only partially represented in FIG. 3. The touch matrix 300 may include many more pixels. The touch matrix may include any suitable number of pixels corresponding to the number antennas in the array of antennas 204 shown in FIG. 2. Furthermore, the touch values depicted in FIG. 2 are idealized for the purpose of illustration. As described below, various forms of normalizing, filtering, and/or other preprocessing may be used to condition a touch matrix for downstream processing (e.g., touch classification).

Returning to FIG. 2, in some implementations, the touch sensor 202 is configured to detect active stylus touch input 210 from one or more active styluses and output a detected active stylus position 212 associated with each of the one or more active styluses. Position 212 may be output in any suitable format, such as a (row, column) display coordinate. In implementations where the touch sensor 202 is a capacitive touch sensor, each active stylus may have a different signal/capacitance such that any one active stylus can be distinguished from any other active stylus or another source of touch input (e.g., finger, passive stylus). In some implementations, the touch sensor 202 may output active stylus input information including an individualized identifier and a detected position of each different active stylus detected by the touch sensor 202.

The touch detection device 200 includes pre-processing logic 214 configured to process the raw touch values of the touch matrix 208 for downstream consumption. In some implementations, the touch detection device 200 is configured to determine hardware calibration values 216 for the array of antennas 204 of the touch sensor 202. The hardware calibration values 216 compensate for differences in the touch values output by the touch sensor 202 relative to a design specification. Such differences may be due to variances/tolerances in manufacturing of the touch sensor 202. The pre-processing logic 214 is configured to normalize touch values of the touch matrix 208 based at least on hardware calibration values 216 to generate normalized touch values 218 of the touch matrix 208. For example, the pre-processing logic 214 may normalize a touch value by shifting the touch value by an offset that is set based at least on a corresponding hardware calibration value. The pre-processing logic 214 may generate the normalized touch values 218 based at least on the hardware calibration values 216 using any suitable normalization techniques.

The technical feature of normalizing touch values of the touch matrix based at least on the hardware calibration values of the individual touch sensor provides the technical benefit of providing a touch matrix as input to the neural network having increased accuracy relative to a touch matrix in which touch values are not normalized in this manner. The more accurate touch matrix provided as input enables the neural network to provide more accurate classification of touch data in the touch matrix.

In some implementations, the touch detection device 200 is configured to determine signal noise 220 generated by the array of antennas 204 of the touch sensor 202. The pre-processing logic 214 is configured to adjust the touch values of the touch matrix 208 based at least on the signal noise 220 to generate noise filtered touch values 222. The noise filtered touch values 222 are adjusted to compensate for the signal noise 220. The pre-processing logic 214 may generate the noise filtered touch values 222 based at least on the signal noise 220 using any suitable noise filtering techniques.

The technical feature of adjusting touch values of the touch matrix based at least on the signal noise generated by antennas of the touch sensor provides the technical benefit of providing a touch matrix as input to the neural network having increased accuracy relative to a touch matrix in which signal noise is not filtered out of touch values of the touch matrix. The more accurate touch matrix provided as input enables the neural network to provide more accurate classification of touch data in the touch matrix.

In some implementations, the pre-processing logic 214 may adjust the touch values of the touch matrix 208 based at least on the hardware calibration values 216 and the signal noise 220.

Note that the pre-processing logic 214 adjusts touch values of the touch matrix 208 but maintains a touch value for every pixel of the touch matrix as opposed to performing operations that identify individual touch blobs within the touch matrix like traditional touch classification approaches.

The neural network 224 is configured to receive the touch matrix 208 and when applicable the active stylus position 212 as input. The neural network 224 is configured to output classified touch data 226 corresponding to measured touch input 206 based at least on the touch values of the touch matrix 208 and the active stylus position 212. In implementations where the pre-processing logic 214 generates the normalized touch values 218, the neural network 224 may receive the normalized touch values 218 as input instead of the raw touch values. In implementations where the pre-processing logic 214 generates the noise filtered touch values 222, the neural network 224 may receive the noise filtered touch values 222 as input instead of the raw touch values. In such implementations, the neural network 224 may be trained using training data that includes different instances of touch matrices and corresponding active stylus positions. In some implementations, the neural network 224 may be trained using different instances of touch matrices including normalized touch values, noise filtered touch values, and/or other pre-processed touch values.

Figure 4:
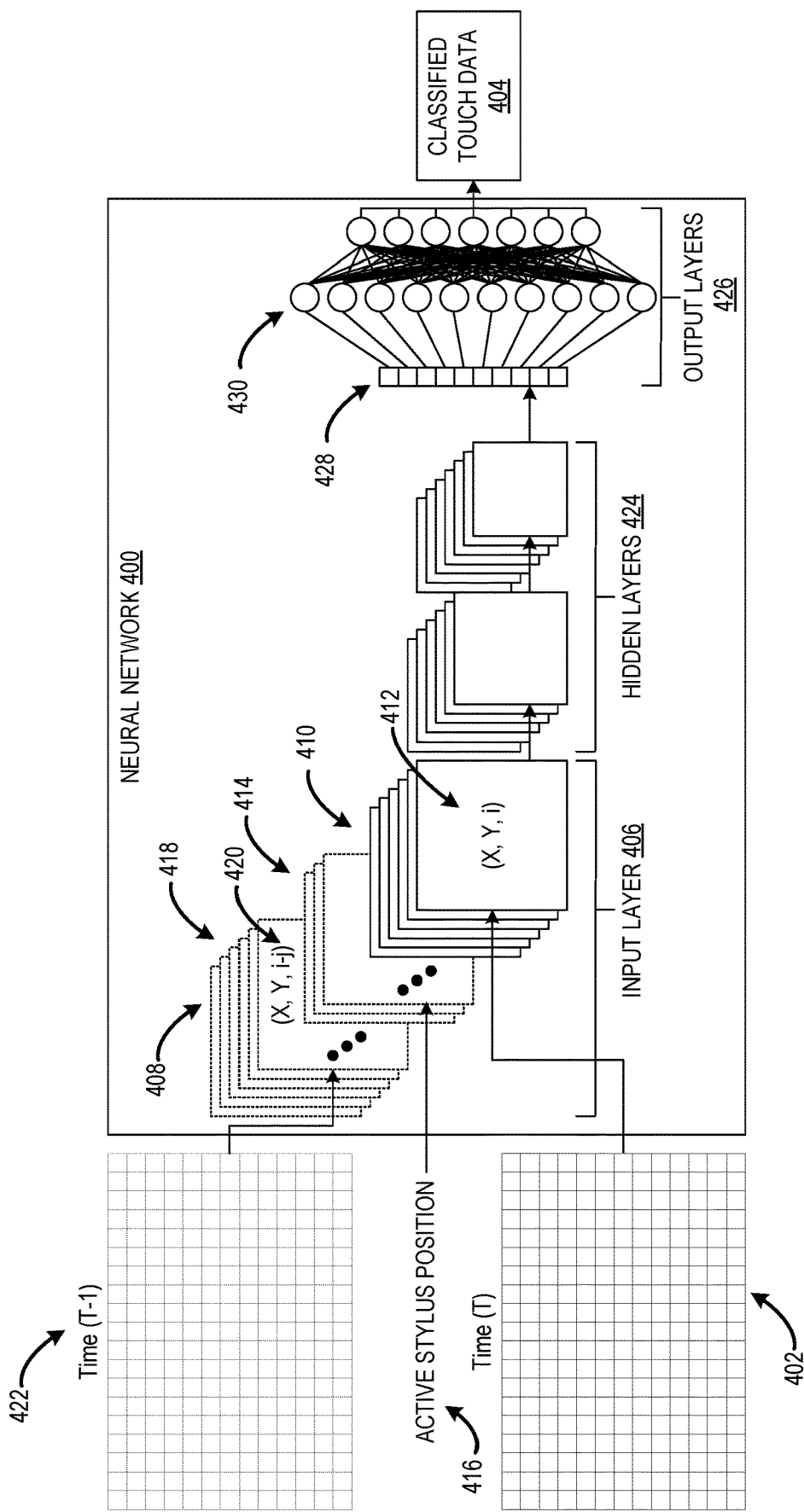
FIG. 4 shows a schematic block diagram of an example neural network configured to receive a touch matrix and output classified touch data based at least on the touch matrix.

FIG. 4 shows a schematic block diagram of an example neural network 400 configured to receive a touch matrix 402 and output classified touch data 404 based at least on the touch matrix 402. For example, the neural network 400 may correspond to the neural network 224 shown in FIG. 2. Neural network 400 is illustrated in simplified form without illustrating all network nodes or edges. It is to be understood that the breadth and depth of neural network 400 may be substantially larger than illustrated, with a sufficient number of input nodes to receive all input, a sufficient number of output nodes to report all classifications, and a sufficient number of hidden layers and nodes to enact the herein described classifications.

The neural network 400 includes an input layer 406 including a plurality of nodes 408. The plurality of nodes 408 include a plurality of touch nodes 410. Each touch node is configured to receive a touch value (i) 412 corresponding to a different pixel of the touch matrix 402 noted in this example by (X, Y) coordinates. Note, that the neural network may be pre-configured such that the same touch node always corresponds to the same pixel, and thus always receives a touch value for that pixel. As such, supplying the touch value to the node unambiguously links that touch value to the corresponding pixel, and the pixel identification need not be communicated with the touch value.

In some implementations, the plurality of nodes 408 of the input layer 406 includes one or more stylus nodes 414 configured to receive an active stylus position 416. The active stylus position 416 may help inform classification of touch inputs represented by the touch matrix 402. For example, the neural network 400 may be trained to recognize and classify touch input created by a palm of a hand when the hand is holding an active stylus. In such implementations, the neural network 400 may be trained on training data that includes numerous touch matrices including various forms of touch input and corresponding active stylus input.

In some implementations, the plurality of nodes 408 of the input layer 406 includes a plurality of differential nodes 418. Each differential node is configured to receive a differential touch value (i−j) 420 corresponding to a difference in touch values of pixels of the touch matrix 402 and a previous touch matrix 422 output by the array of antennas 204 (shown in FIG. 2). For example, the touch sensor 202 (shown in FIG. 2) may be configured to output a new touch matrix according to a designated touch frame rate. In the illustrated example, the touch matrix 402 may be output at time (T) and the previous touch matrix 422 may be output at time (T−1) corresponding to one prior touch frame of the designated touch frame rate. The differential touch values 420 may help inform classification of touch inputs represented by the touch matrix 402 by tracking classified touch inputs across a sequence of touch matrices. For example, touch input that was classified in one position in a previous touch matrix may be taken into consideration by the neural network 400 to classify touch input at the same position in the current touch matrix. In such implementations, the neural network 400 may be trained on training data that includes numerous touch matrices including various forms of touch input and corresponding differential values representing touch input from a previous touch matrix. The technical feature of providing differential touch values as input to the nodes of the input layer of the neural network in addition to the touch values of the current touch matrix provides the technical benefit of enabling the neural network to reduce a number of possible predictions for any particular touch input based at least on the differential touch values. This reduces the time for the neural network to process the touch matrix and increases classification accuracy of the touch data in the touch matrix.

Figure 5:
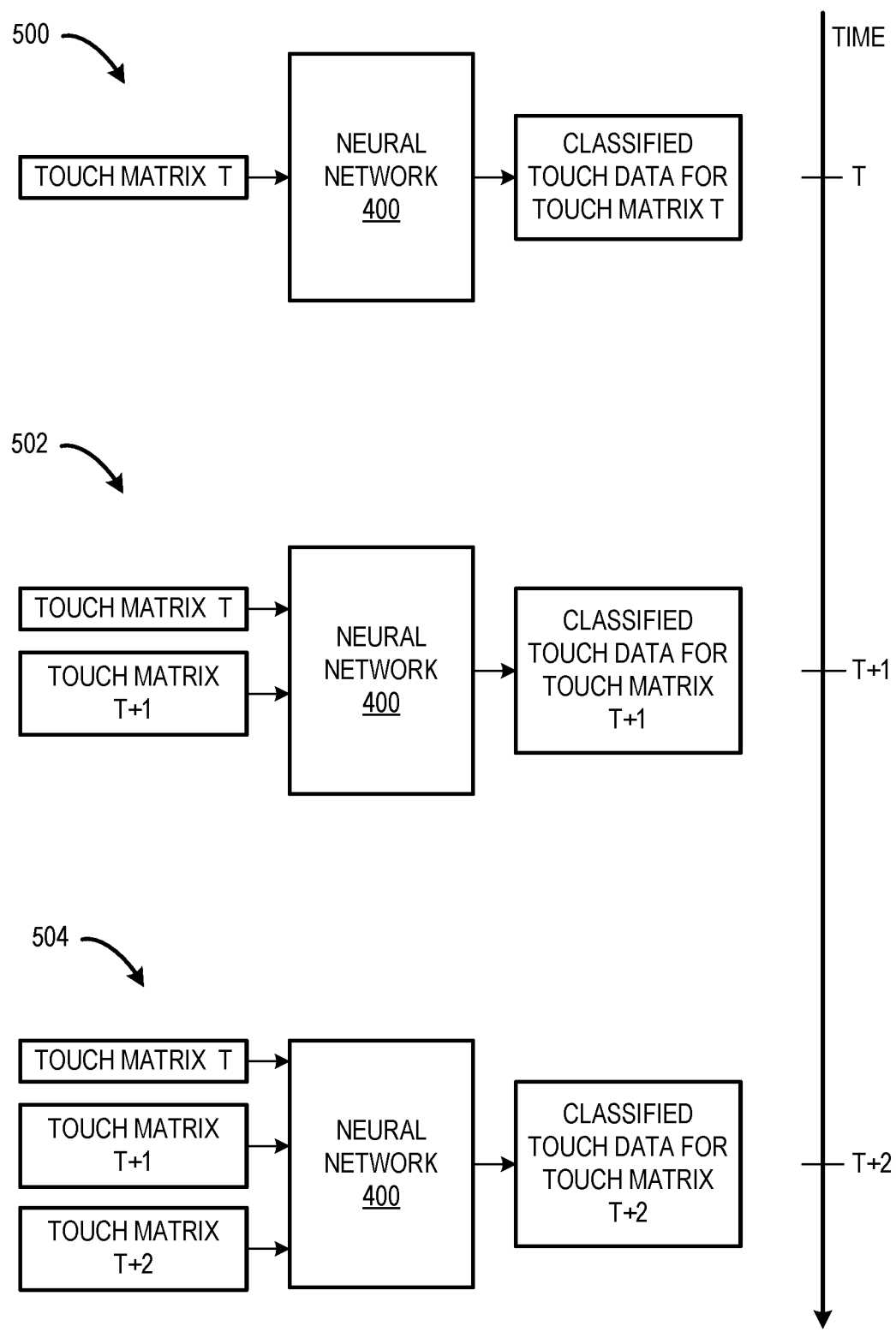
FIG. 5 shows an example scenario where a neural network outputs classified touch data based at least on a sequence of touch matrices.

In some implementations, as shown in FIG. 5, the neural network 400 may be configured to output the classified touch data 404 based at least on touch values corresponding to different pixels of a temporal sequence of touch matrices. In the illustrated example, at 500, the neural network 400 receives a touch matrix generated at time T. The neural network 400 outputs classified touch data for the touch matrix T since that is the only touch matrix available to process. At 502, the neural network 400 receives a sequence of touch matrices including the touch matrix generated at time T and a touch matrix generated at time T+1. In this case T+1 indicates a next touch frame in the sequence. The neural network 400 outputs classified touch data for the touch matrix generated at time T+1 based at least on the touch matrix generated at time T and the touch matrix generated at time T+1. In this case, the neural network 400 analyzes both touch matrices to classify the touch data in the touch matrix generated at time T+1. At 504, the neural network 400 receives a sequence of touch matrices including the touch matrix generated at time T, the touch matrix generated at time T+1, and a touch matrix generated at time T+2. In this case T+2 indicates a next touch frame in the sequence. The neural network 400 outputs classified touch data for the touch matrix generated at time T+2 based at least on the touch matrix generated at time T, the touch matrix generated at time T+1, and the touch matrix generated at time T+2. In this case, the neural network 400 analyzes all three touch matrices to classify the touch data in the touch matrix generated at time T+2. For example, the neural network may track different touch inputs over time across the sequence of touch matrices to help classify touch input in a particular touch matrix. In such implementations, the neural network 400 may be trained on training data that includes numerous sequences of touch matrices including various forms of touch input.

In such scenarios, the input layer 406 of the neural network 400 may include a plurality of nodes that are configured to receive a touch value corresponding to a different pixel of the temporal sequence of touch matrices. In other words, the same node receives touch values associated with the same pixel across the sequence of touch matrices. In other examples, the input layer 406 may include individual nodes for every pixel of every touch matrix that is provided as input to the neural network 400.

The technical feature of providing a sequence of touch matrices as input to the nodes of the input layer of the neural network provides the technical benefit of enabling the neural network to reduce a number of possible predictions for any particular touch input based at least on touch input tracked across the sequence of touch matrices that increases classification accuracy of the touch data in the touch matrix.

Returning to FIG. 4, the neural network includes one or more hidden layers 424 that are connected to the input layer 406. The hidden layers 424 perform convolution and pooling operations on the touch values received by the nodes of the input layer 406. Convolutional layers within the hidden layers 424 convolve the touch values and pass the results to the next layer. The pooling layers within the hidden layers 424 reduce the dimensions of data by combining the outputs of neuron clusters at one layer into a single neuron in the next layer. The hidden layers 424 output convolved and pooled touch information to output layers 426. The output layers 426 include a flattening layer 428 and a fully connected layer 430. The convolved and pooled touch matrix information is flattened by the flattening layer 428 and processed by the fully connected layer 430 to classify touch input in the touch matrix 402 as the classified touch data 404. Note that the illustrated output layers 426 are merely a non-limiting schematic representation. One or more output layers may be configured differently depending on the type of neural network that is implemented.

In one example where the neural network implements a region proposal approach, the output layers 426 may include two fully connected layers. One fully connected layer may be configured to predict which class a touch blob belongs to. The other fully connected layer may be configured to perform regression on the exact bounding box coordinates corresponding to the touch blob.

In another example where the neural network implements a single shot detection approach (e.g., YOLO), the hidden layers 424 output a plurality of feature maps in different scales to an output layer. The output layer is configured to output a 3-dimensional tensor with shape (N, M, C) where N is the number of bounding boxes predicted by the network, M is the number of anchor boxes used, and C is the number of class probabilities and bounding box parameters predicted. Each bounding box may be represented by (Xmin, Ymin, Xmax, Ymax) parameters, and each class probability may be represented by the predicted probability that an object of the corresponding class is present within the bounding box. Note that, in some implementations, the classified touch data output by the neural network can also be post-processed to remove duplicate or low-confidence predictions by using a mechanism like non-maximum suppression (NMS) to produce a final set of bounding boxes with class labels and probabilities.

In implementations where the neural network 400 receives a temporal sequence of touch matrices for a designated time period, the neural network 400 is configured to output the classified touch data 404 based at least on the touch values corresponding to different pixels of the temporal sequence of touch matrices.

In implementations where the neural network 400 receives differential touch values 420 corresponding to a difference in touch values of pixels of the touch matrix 402 and the previous touch matrix 422, the neural network 400 is configured to output the classified touch data 404 based at least on the touch values of the touch matrix 402 and the differential touch values 420.

In implementations where the neural network 400 receives the detected active stylus position 416, the neural network 400 is configured to output the classified touch data 404 based at least on the touch values of the touch matrix 402 and the detected active stylus position 416.

Returning to FIG. 2, the neural network 224 may take various forms. In some implementations, the neural network 224 is a convolutional neural network. In some such implementations, the convolutional neural network is a region-based convolutional neural network. In some implementations, the neural network is a fully connected neural network. In some implementations, the neural network 224 is a one-stage type of neural network, such as a single shot detection neural network (e.g., SqueezeDet, MobileNet, Blaze, YOLO). In some implementations, the neural network 224 is a two-stage type of neural network, such as a feature pyramid neural network or a region proposal neural network. The neural network 224 may be any suitable type of neural network that is trained to classify touch input data corresponding to touch input represented in a touch matrix using any suitable object detection and/or localization.

The neural network 224 is configured to output the classified touch data 226 based at least on the touch values of the touch matrix 208 and other touch input data when applicable. For example, the neural network may be extended to receive as input one or more other parameters along with the touch matrix, active stylus position, and/or other inputs described above. As one example, an orientation of the device as assessed by an inertial measurement unit may be provided as input to the neural network.

Figure 6:
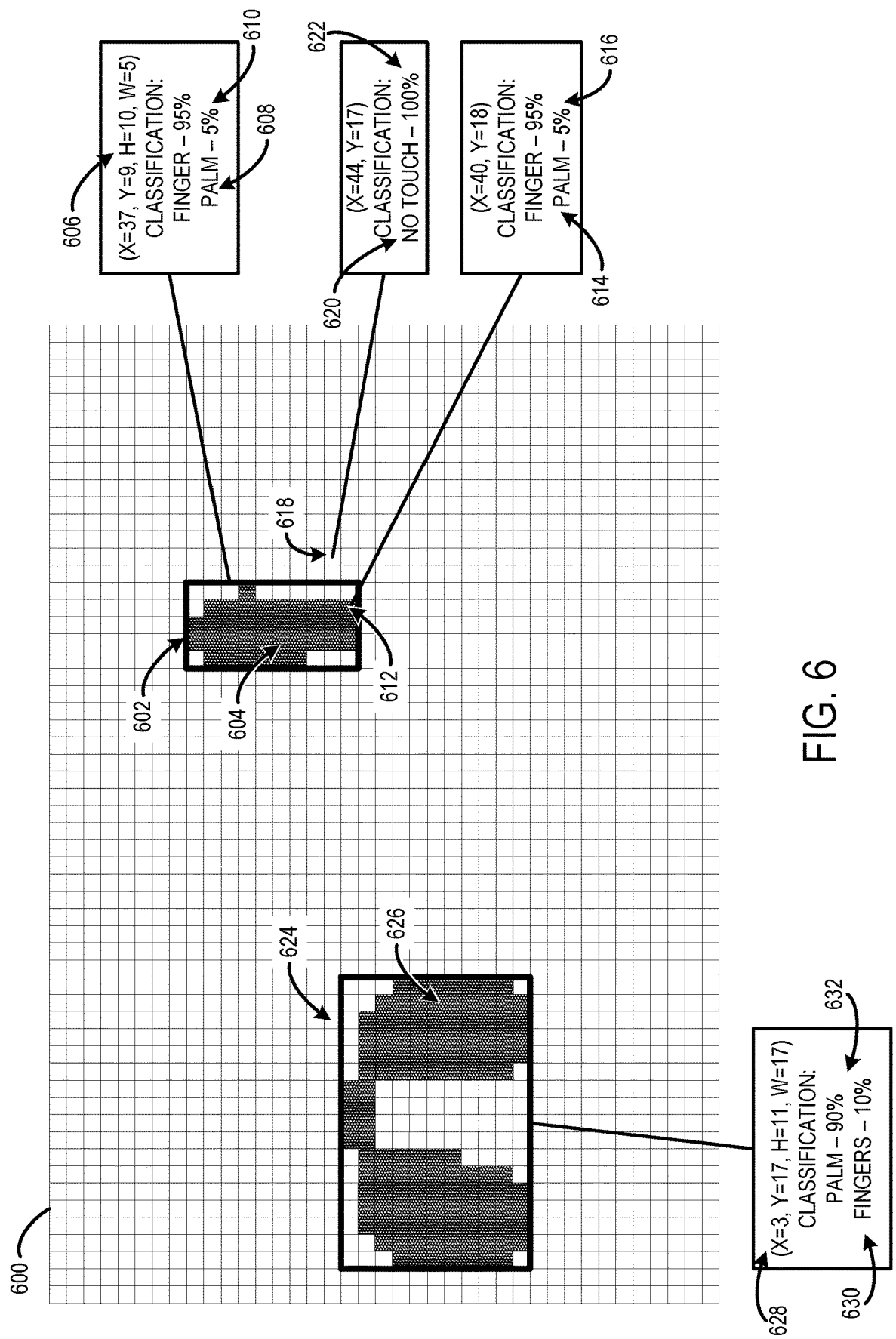
FIG. 6 shows example touch data in a touch matrix classified by a neural network.

The classified touch data 226 may take various forms depending on the configuration of the neural network. FIG. 6 shows example touch data in a touch matrix 600 classified by the neural network 224. The touch matrix 600 includes 1-to-N bounding boxes, where N is the number of touch inputs detected in the touch matrix. Each bounding box of the 1-to-N bounding boxes corresponds to a different touch input detected in the touch matrix 600. A first bounding box 602 corresponds to a first touch input 604. The first bounding box 602 is defined by classification data 606 including a horizontal corner coordinate of the touch matrix, a vertical corner coordinate of the touch matrix, a height, and a width. The first bounding box 602 is labeled with touch classifications 608 and corresponding confidences 610. In the illustrated example, the first touch input 604 is classified as a finger with 95% confidence, and a palm with 5% confidence.

Additionally or alternatively, the neural network 224 may output classified touch data that includes, for each pixel of the touch matrix 600, one or more touch classifications and one or more confidences corresponding to the one or more touch classifications. As one example, a first pixel 612 is included in the detected first touch input 604 and is labeled with classification data including touch classifications 614 and corresponding confidences 616. Since the first pixel 612 is associated with the first touch input 604, the first pixel 612 is classified as a finger with 95% confidence and a palm with 5% confidence. As another example, a second pixel 618 is not part of the first touch input 604. The second pixel 618 is labeled with classification data including a touch classification 620 and a corresponding confidence 622. Since the second pixel 618 is not associated with the first touch input 604, the second pixel 618 is classified as no touch with 100% confidence.

The touch matrix 600 further includes a second bounding box 624 corresponding to a second touch input 626. The second bounding box 624 is defined by classification data 628 including a horizontal corner coordinate of the touch matrix, a vertical corner coordinate of the touch matrix, a height, and a width. The second bounding box 624 is labeled with touch classifications 630 and corresponding confidences 632. In the illustrated example, the second touch input 626 is classified as a palm with 90% confidence, and a set of fingers with 10% confidence.

In this example, the second touch input 626 is accurately classified as a single touch input in the form of a palm of a hand. This is because the neural network 224 is able to wholistically analyze the entire touch matrix 600 to classify the different touch inputs. In contrast, a traditional touch input classification approach would split the second touch input 626 into two separate blobs as part of an iterative pre-processing operation. The two touch input blobs would be analyzed separately and independently, which would result in misclassification of the two touch input blobs.

Figure 7:
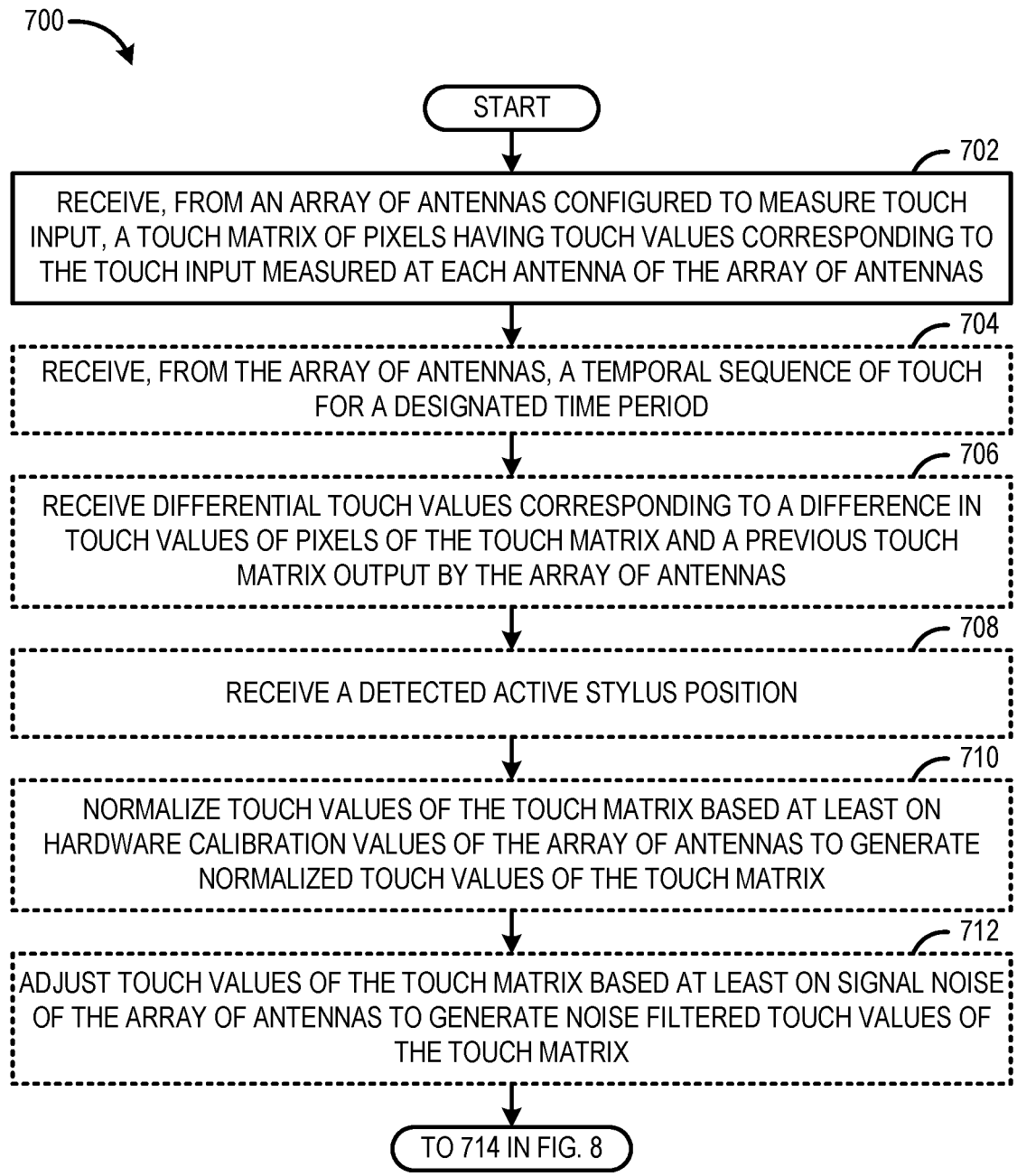
FIGS. 7-8 show a flowchart of an example computer-implemented method for classifying touch input.
Figure 8:
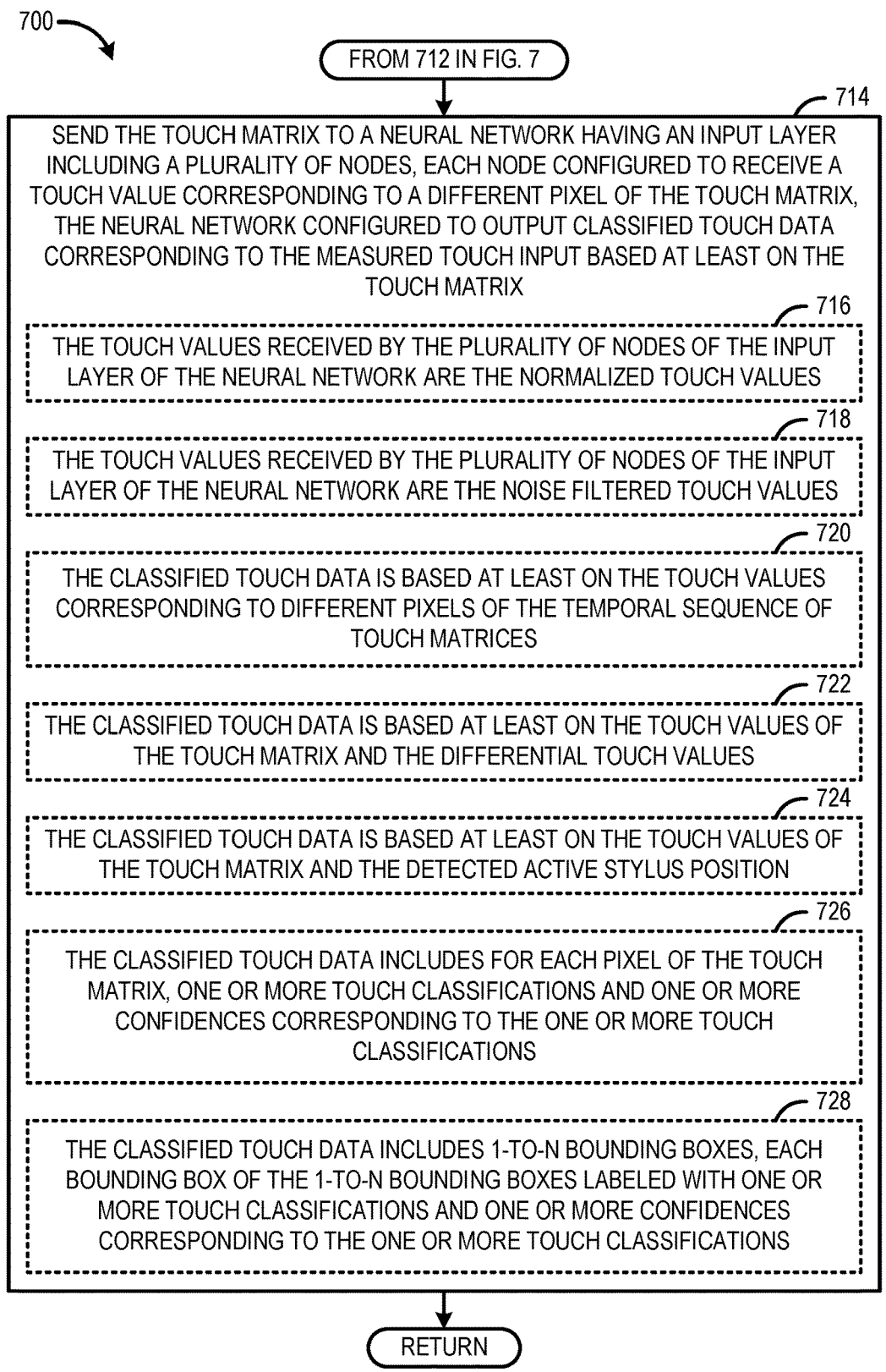

FIGS. 7-8 show a flowchart of an example computer-implemented method 700 for classifying touch input. For example, the computer-implemented method 700 may be performed by the touch detection device 100 shown in FIG. 1, the touch detection device 200 shown in FIG. 2, or another computing device.

In FIG. 7, at 702, the computer-implemented method 700 includes receiving, from an array of antennas configured to measure touch input, a touch matrix of pixels having touch values corresponding to the touch input measured at each antenna of the array of antennas.

In some implementations, at 704, the computer-implemented method 700 may include receiving, from the array of antennas a temporal sequence of touch matrices for a designated time period.

In some implementations, at 706, the computer-implemented method 700 may include receiving differential touch values corresponding to a difference in touch values of pixels of the touch matrix and a previous touch matrix output by the array of antennas.

In some implementations, at 708, the computer-implemented method 700 may include receiving a detected active stylus position of an active stylus relative to the array of antennas.

In some implementations, at 710, the computer-implemented method 700 may include normalizing touch values of the touch matrix based at least on hardware calibration values of the array of antennas to generate normalized touch values of the touch matrix. Note that such normalization may be performed for each touch matrix that is received, such as each touch matrix in a sequence of touch matrices. Additionally, such normalization may be performed on differential touch values that are received.

In some implementations, at 712, the computer-implemented method 700 may include adjusting touch values of the touch matrix based at least on signal noise of the array of antennas to generate noise filtered touch values of the touch matrix. Note that such noise-based adjustment may be performed for each touch matrix that is received, such as each touch matrix in a sequence of touch matrices. Additionally, such noise-based adjustment may be performed on differential touch values that are received.

In FIG. 8, at 714, the computer-implemented method 700 includes sending the touch matrix to a neural network having an input layer including a plurality of nodes. Each node of the plurality of nodes of the input layer is configured to receive a touch value corresponding to a different pixel of the touch matrix. The neural network is configured to output classified touch data corresponding to the measured touch input based at least on the touch matrix.

In some implementations, at 716, the touch values received by the plurality of nodes of the input layer of the neural network may be normalized touch values. The normalized touch values are generated based at least on hardware calibration values of the array of antennas.

In some implementations, at 718, the touch values received by the plurality of nodes of the input layer of the neural network may be noise filtered touch values. The noise filtered touch values are adjusted to compensate for signal noise of the array of antennas.

In some implementations where the neural network receives temporal sequence of touch matrices, at 720, the classified touch data may be generated based at least on the touch values corresponding to different pixels of the temporal sequence of touch matrices.

In some implementations where the neural network receives differential touch values, at 722, the classified touch data may be generated based at least on the touch values of the touch matrix and the differential touch values.

In some implementations where the neural network receives a detected stylus position, at 724, the classified touch data may be generated based at least on the touch values of the touch matrix and the detected active stylus position.

In some implementations, at 726, the classified touch data may include for each pixel of the touch matrix, one or more touch classifications and one or more confidences corresponding to the one or more touch classifications.

In some implementations, at 728, the classified touch data may include 1-to-N bounding boxes, where N is the number of touch inputs detected in the touch matrix. Each bounding box of the 1-to-N bounding boxes may correspond to a different touch element detected in the touch matrix Each bounding box of the 1-to-N bounding boxes is labeled with one or more touch classifications and one or more confidences corresponding to the one or more touch classifications.

The computer-implemented method employs a neural network to classify touch data. The neural network applies deep learning techniques to detect and classify touch input using contextual touch information found throughout the entire touch matrix. Such a touch classification approach provides the technical benefit of improving touch classification accuracy relative to traditional touch classification approaches that classify individual touch blobs. Moreover, such a touch classification approach provides the technical benefit of improving the speed at which touch classification is performed relative to traditional touch classification approaches, since the neural network can analyze the entire touch matrix in one processing cycle as opposed to a slower iterative process employed by traditional touch classification approaches.

In some implementations, the methods and processes described herein may be tied to a computing system of one or more computing devices. In particular, such methods and processes may be implemented as a computer-application program or service, an application-programming interface (API), a library, and/or other computer-program product.

Figure 9:
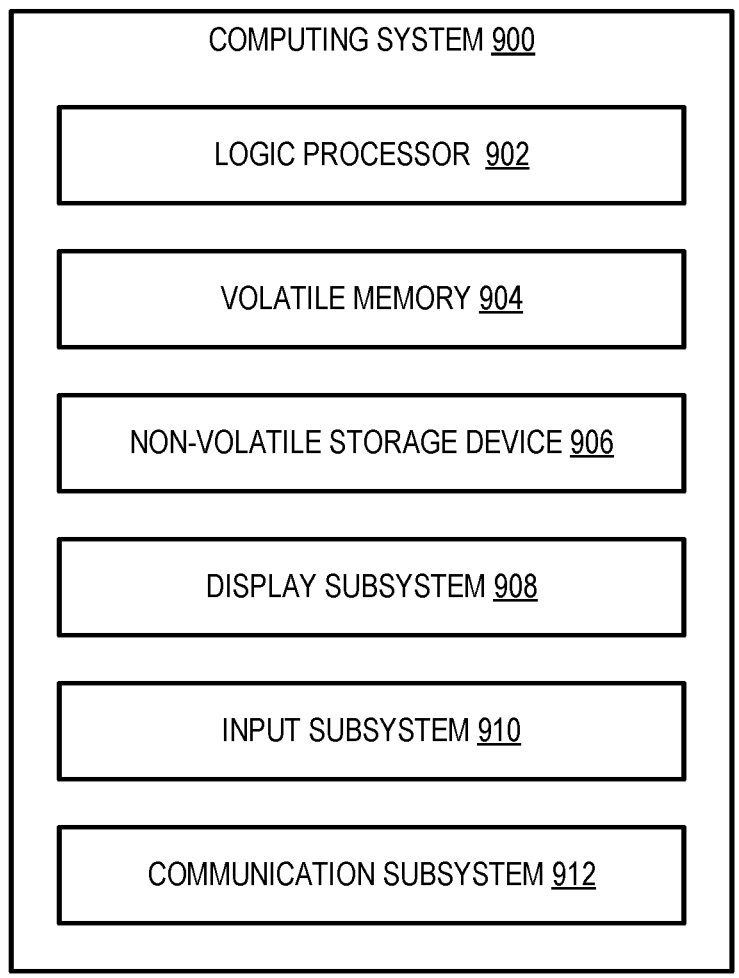
FIG. 9 schematically shows an example computing system.

FIG. 9 schematically shows a non-limiting implementation of a computing system 900 that can enact one or more of the methods and processes described above. Computing system 900 is shown in simplified form. Computing system 900 may embody the touch detection device 100 shown in FIG. 1 and the touch detection device 200 shown in FIG. 2.

Computing system 900 may take the form of one or more personal computers, server computers, tablet computers, network computing devices, mobile computing devices, mobile communication devices (e.g., smart phone), wearable computing devices such as smart wristwatches and head mounted augmented reality devices, and/or other computing devices.

Computing system 900 includes a logic processor 902, volatile memory 904, and a non-volatile storage device 906. Computing system 900 may optionally include a display subsystem 909, input subsystem 910, communication subsystem 912, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 909 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 909 may likewise be transformed to visually represent changes in the underlying data. Display subsystem 909 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some implementations, the communication subsystem may allow computing system 900 to send and/or receive messages to and/or from other devices via a network such as the Internet.

In an example, a touch detection device comprises an array of antennas configured to measure touch input and output a touch matrix of pixels having touch values corresponding to the touch input measured at each antenna of the array of antennas, and a neural network having an input layer including a plurality of nodes, each node configured to receive a touch value corresponding to a different pixel of the touch matrix, the neural network configured to output classified touch data corresponding to the measured touch input based at least on the touch matrix. In this example and/or other examples, the classified touch data may include for each pixel of the touch matrix, one or more touch classifications and one or more confidences corresponding to the one or more touch classifications. In this example and/or other examples, the classified touch data may include 1-to-N bounding boxes, where N is the number of touch inputs detected in the touch matrix, each bounding box of the 1-to-N bounding boxes corresponding to a different touch element detected in the touch matrix, each bounding box of the 1-to-N bounding boxes labeled with one or more touch classifications and one or more confidences corresponding to the one or more touch classifications. In this example and/or other examples, each bounding box of the 1-to-N bounding boxes may be defined by a horizontal corner coordinate of the touch matrix, a vertical corner coordinate of the touch matrix, a height, and a width. In this example and/or other examples, the touch values of the touch matrix may include touch values corresponding to touch input contacting the touch detection device and touch values corresponding to touch input hovering proximate to the touch detection device. In this example and/or other examples, the touch detection device may further comprise pre-processing logic configured to normalize touch values of the touch matrix based at least on hardware calibration values of the array of antennas to generate normalized touch values of the touch matrix, and the touch values received by the plurality of nodes of the input layer of the neural network may be the normalized touch values. In this example and/or other examples, the touch detection device may further comprise pre-processing logic configured to adjust touch values of the touch matrix based at least on signal noise of the array of antennas to generate noise filtered touch values of the touch matrix, and the touch values received by the plurality of nodes of the input layer of the neural network may be the noise filtered touch values. In this example and/or other examples, the array of antennas may be configured to output a temporal sequence of touch matrices for a designated time period, each node of the plurality of nodes of the input layer of the neural network may be configured to receive a touch value corresponding to a different pixel of the temporal sequence of touch matrices, and the neural network may be configured to output the classified touch data based at least on the touch values corresponding to different pixels of the temporal sequence of touch matrices. In this example and/or other examples, the plurality of nodes of the input layer of the neural network may include nodes configured to receive differential touch values corresponding to a difference in touch values of pixels of the touch matrix and a previous touch matrix output by the array of antennas, and the neural network may be configured to output the classified touch data based at least on the touch values of the touch matrix and the differential touch values. In this example and/or other examples, the array of antennas may be configured to detect active stylus touch input and output a detected active stylus position, the input layer of the neural network may include one or more nodes configured to receive the detected active stylus position, and the neural network may be configured to output the classified touch data based at least on the touch values of the touch matrix and the detected active stylus position.

In another example, a computer-implemented method for classifying touch input comprises receiving, from an array of antennas configured to measure touch input, a touch matrix of pixels having touch values corresponding to the touch input measured at each antenna of the array of antennas, and sending the touch matrix to a neural network having an input layer including a plurality of nodes, each node configured to receive a touch value corresponding to a different pixel of the touch matrix, the neural network configured to output classified touch data corresponding to the measured touch input based at least on the touch matrix. In this example and/or other examples, the classified touch data may include for each pixel of the touch matrix, one or more touch classifications and one or more confidences corresponding to the one or more touch classifications. In this example and/or other examples, the classified touch data may include 1-to-N bounding boxes, where N is the number of touch inputs detected in the touch matrix, each bounding box of the 1-to-N bounding boxes corresponding to a different touch element detected in the touch matrix, each bounding box of the 1-to-N bounding boxes labeled with one or more touch classifications and one or more confidences corresponding to the one or more touch classifications. In this example and/or other examples, each bounding box of the 1-to-N bounding boxes may be defined by a horizontal corner coordinate of the touch matrix, a vertical corner coordinate of the touch matrix, a height, and a width. In this example and/or other examples, the touch values of the touch matrix may include touch values corresponding to touch input contacting the touch detection device and touch values corresponding to touch input hovering proximate to the touch detection device. In this example and/or other examples, the computer-implemented method may further comprise normalizing touch values of the touch matrix based at least on hardware calibration values of the array of antennas to generate normalized touch values of the touch matrix, and wherein the touch values received by the plurality of nodes of the input layer of the neural network are the normalized touch values. In this example and/or other examples, the computer-implemented method may further comprise adjusting touch values of the touch matrix based at least on signal noise of the array of antennas to generate noise filtered touch values of the touch matrix, and wherein the touch values received by the plurality of nodes of the input layer of the neural network are the noise filtered touch values. In this example and/or other examples, the computer-implemented method may further comprise receiving, from the array of antennas, a temporal sequence of touch matrices for a designated time period, wherein each node of the plurality of nodes of the input layer of the neural network is configured to receive a touch value corresponding to a different pixel of the temporal sequence of touch matrices, and wherein the neural network is configured to output the classified touch data based at least on the touch values corresponding to different pixels of the temporal sequence of touch matrices. In this example and/or other examples, the array of antennas may be configured to detect active touch stylus input and output a detected active stylus position, the input layer of the neural network may include one or more nodes configured to receive the detected active stylus position, and the neural network may be configured to output the classified touch data based at least on the touch values of the touch matrix and the detected active stylus position.

In yet another example, a touch detection device comprises an array of antennas configured to measure touch input and detect active stylus touch input and output a touch matrix of pixels having touch values corresponding to the touch input measured at each antenna of the array of antennas and an active stylus position based at least on the detected active stylus touch input, and a neural network having an input layer including a plurality of touch nodes and one or more stylus nodes, each touch node configured to receive a touch value corresponding to a different pixel of the touch matrix, the one or more stylus nodes configured to receive the detected active stylus position, and the neural network configured to output classified touch data corresponding to the measured touch input based at least on the touch matrix and the detective active stylus position.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A touch detection device, comprising:
   an array of antennas configured to measure touch input and output a touch matrix of pixels having touch values corresponding to the touch input measured at each antenna of the array of antennas; and
   a neural network having an input layer including a plurality of nodes, each node configured to receive a touch value corresponding to a different pixel of the touch matrix, the neural network configured to output classified touch data corresponding to the measured touch input based at least on the touch matrix.

2. The touch detection device of claim 1, wherein the classified touch data includes for each pixel of the touch matrix, one or more touch classifications and one or more confidences corresponding to the one or more touch classifications.

3. The touch detection device of claim 1, wherein the classified touch data includes 1-to-N bounding boxes, where N is the number of touch inputs detected in the touch matrix, each bounding box of the 1-to-N bounding boxes corresponding to a different touch element detected in the touch matrix, each bounding box of the 1-to-N bounding boxes labeled with one or more touch classifications and one or more confidences corresponding to the one or more touch classifications.

4. The touch detection device of claim 3, wherein each bounding box of the 1-to-N bounding boxes is defined by a horizontal corner coordinate of the touch matrix, a vertical corner coordinate of the touch matrix, a height, and a width.

5. The touch detection device of claim 1, wherein the touch values of the touch matrix include touch values corresponding to touch input contacting the touch detection device and touch values corresponding to touch input hovering proximate to the touch detection device.

6. The touch detection device of claim 1, further comprising:
   pre-processing logic configured to normalize touch values of the touch matrix based at least on hardware calibration values of the array of antennas to generate normalized touch values of the touch matrix, and wherein the touch values received by the plurality of nodes of the input layer of the neural network are the normalized touch values.

7. The touch detection device of claim 1, further comprising:
   pre-processing logic configured to adjust touch values of the touch matrix based at least on signal noise of the array of antennas to generate noise filtered touch values of the touch matrix, and wherein the touch values received by the plurality of nodes of the input layer of the neural network are the noise filtered touch values.

8. The touch detection device of claim 1, wherein the array of antennas is configured to output a temporal sequence of touch matrices for a designated time period, wherein each node of the plurality of nodes of the input layer of the neural network is configured to receive a touch value corresponding to a different pixel of the temporal sequence of touch matrices, and wherein the neural network is configured to output the classified touch data based at least on the touch values corresponding to different pixels of the temporal sequence of touch matrices.

9. The touch detection device of claim 1, wherein the plurality of nodes of the input layer of the neural network includes nodes configured to receive differential touch values corresponding to a difference in touch values of pixels of the touch matrix and a previous touch matrix output by the array of antennas, and wherein the neural network is configured to output the classified touch data based at least on the touch values of the touch matrix and the differential touch values.

10. The touch detection device of claim 1, wherein the array of antennas is configured to detect active stylus touch input and output a detected active stylus position, wherein the input layer of the neural network includes one or more nodes configured to receive the detected active stylus position, and wherein the neural network is configured to output the classified touch data based at least on the touch values of the touch matrix and the detected active stylus position.

11. A computer-implemented method for classifying touch input, the method comprising:
   receiving, from an array of antennas configured to measure touch input, a touch matrix of pixels having touch values corresponding to the touch input measured at each antenna of the array of antennas; and
   sending the touch matrix to a neural network having an input layer including a plurality of nodes, each node configured to receive a touch value corresponding to a different pixel of the touch matrix, the neural network configured to output classified touch data corresponding to the measured touch input based at least on the touch matrix.

12. The computer-implemented method of claim 11, wherein the classified touch data includes for each pixel of the touch matrix, one or more touch classifications and one or more confidences corresponding to the one or more touch classifications.

13. The computer-implemented method of claim 11, wherein the classified touch data includes 1-to-N bounding boxes, where N is the number of touch inputs detected in the touch matrix, each bounding box of the 1-to-N bounding boxes corresponding to a different touch element detected in the touch matrix, each bounding box of the 1-to-N bounding boxes labeled with one or more touch classifications and one or more confidences corresponding to the one or more touch classifications.

14. The computer-implemented method of claim 13, wherein each bounding box of the 1-to-N bounding boxes is defined by a horizontal corner coordinate of the touch matrix, a vertical corner coordinate of the touch matrix, a height, and a width.

15. The computer-implemented method of claim 11, wherein the touch values of the touch matrix include touch values corresponding to touch input contacting the touch detection device and touch values corresponding to touch input hovering proximate to the touch detection device.

16. The computer-implemented method of claim 11, further comprising:
normalizing touch values of the touch matrix based at least on hardware calibration values of the array of antennas to generate normalized touch values of the touch matrix, and wherein the touch values received by the plurality of nodes of the input layer of the neural network are the normalized touch values.

17. The computer-implemented method of claim 11, further comprising:
adjusting touch values of the touch matrix based at least on signal noise of the array of antennas to generate noise filtered touch values of the touch matrix, and wherein the touch values received by the plurality of nodes of the input layer of the neural network are the noise filtered touch values.

18. The computer-implemented method of claim 11, further comprising:
receiving, from the array of antennas, a temporal sequence of touch matrices for a designated time period, wherein each node of the plurality of nodes of the input layer of the neural network is configured to receive a touch value corresponding to a different pixel of the temporal sequence of touch matrices, and wherein the neural network is configured to output the classified touch data based at least on the touch values corresponding to different pixels of the temporal sequence of touch matrices.

19. The computer-implemented method of claim 11, wherein the array of antennas is configured to detect active touch stylus input and output a detected active stylus position, wherein the input layer of the neural network includes one or more nodes configured to receive the detected active stylus position, and wherein the neural network is configured to output the classified touch data based at least on the touch values of the touch matrix and the detected active stylus position.

20. A touch detection device, comprising:
an array of antennas configured to measure touch input and detect active stylus touch input and output a touch matrix of pixels having touch values corresponding to the touch input measured at each antenna of the array of antennas and an active stylus position based at least on the detected active stylus touch input; and
a neural network having an input layer including a plurality of touch nodes and one or more stylus nodes, each touch node configured to receive a touch value corresponding to a different pixel of the touch matrix, the one or more stylus nodes configured to receive the detected active stylus position, and the neural network configured to output classified touch data corresponding to the measured touch input based at least on the touch matrix and the detective active stylus position.

* * * * *